United States Patent
Akhavain Mohammadi et al.

(10) Patent No.: US 11,601,780 B2
(45) Date of Patent: Mar. 7, 2023

(54) METHOD AND APPARATUS FOR PROPAGATING NETWORK STATUS UPDATES USING DIRECTIONAL TRACKING

(71) Applicant: HUAWEI TECHNOLOGIES CO., LTD., Shenzhen (CN)

(72) Inventors: Mehdi Arashmid Akhavain Mohammadi, Ottawa (CA); Hassan Halabian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 17/141,824

(22) Filed: Jan. 5, 2021

(65) Prior Publication Data

US 2022/0217498 A1   Jul. 7, 2022

(51) Int. Cl.
| | |
|---|---|
| *H04W 4/02* | (2018.01) |
| *H04W 24/10* | (2009.01) |
| *H04W 84/18* | (2009.01) |
| *H04W 24/02* | (2009.01) |
| *H04W 24/08* | (2009.01) |

(52) U.S. Cl.
CPC .......... *H04W 4/026* (2013.01); *H04W 24/02* (2013.01); *H04W 24/08* (2013.01); *H04W 24/10* (2013.01); *H04W 84/18* (2013.01)

(58) Field of Classification Search
None
See application file for complete search history.

(56) References Cited

U.S. PATENT DOCUMENTS

| | | |
|---|---|---|
| 5,930,348 A | 7/1999 | Regnier et al. |
| 6,147,980 A | 11/2000 | Yee et al. |
| 6,208,295 B1 | 3/2001 | Dogan |
| (Continued) | | |

FOREIGN PATENT DOCUMENTS

| | | |
|---|---|---|
| CN | 1681257 A | 10/2005 |
| CN | 101119372 A | 2/2008 |
| (Continued) | | |

OTHER PUBLICATIONS

Ericsson Latency analysis of SCell BFR solutions 3GPPTSG-RAN }VGI Meeting #97, R1-1907438 May 17, 2019 (May 17, 2019), 4 pages.

(Continued)

*Primary Examiner* — Adolf Dsouza

(57) ABSTRACT

A method and apparatus for managing network status information in a network, such as a satellite mesh network. A network node receives a network status update, indicative of a change in network conditions, from another node, e.g. via flooding. Based on a direction of travel of the update, content of at least one counter field of the network status update is adjusted. The update is then propagated, or not, based on the counter fields. A counter field may be increased in response to the update travelling in one direction and decreased in response to the update travelling in an opposite direction. Different counter fields may be adjusted in response to the update travelling in different, e.g. orthogonal, directions. The direction can be determined based on which of plural directional communication interfaces received the update.

24 Claims, 8 Drawing Sheets

(56) References Cited

U.S. PATENT DOCUMENTS

| | | |
|---|---|---|
| 6,804,199 B1 | 10/2004 | Kelly et al. |
| 6,816,460 B1 | 11/2004 | Ahmed et al. |
| 7,613,121 B2 | 11/2009 | Chou |
| 7,945,272 B2 | 5/2011 | Kim |
| 10,796,251 B2 | 10/2020 | Frederick et al. |
| 2004/0028060 A1 | 2/2004 | Kang |
| 2005/0152333 A1 | 7/2005 | Smith |
| 2005/0198286 A1 | 9/2005 | Xu |
| 2006/0218225 A1 | 9/2006 | Hee Voon et al. |
| 2007/0147254 A1 | 6/2007 | Larsson |
| 2007/0239349 A1 | 10/2007 | Ohnishi et al. |
| 2009/0046732 A1 | 2/2009 | Pratt, Jr. et al. |
| 2010/0008368 A1 | 1/2010 | Karloff |
| 2012/0014316 A1 | 1/2012 | Rahman |
| 2012/0173527 A1 | 7/2012 | Thiesson |
| 2012/0238235 A1 | 9/2012 | Lee |
| 2013/0036236 A1 | 2/2013 | Morales et al. |
| 2013/0232565 A1 | 9/2013 | O'Connor et al. |
| 2014/0044008 A1 | 2/2014 | Skalecki et al. |
| 2014/0126416 A1 | 5/2014 | Yu et al. |
| 2014/0165163 A1 | 6/2014 | Salkintzis |
| 2014/0177522 A1 | 6/2014 | Marshack |
| 2014/0229405 A1 | 8/2014 | Govrin |
| 2014/0278590 A1 | 9/2014 | Abbassi |
| 2014/0379929 A1 | 12/2014 | Cicic et al. |
| 2016/0057004 A1 | 2/2016 | Ge |
| 2016/0323175 A1 | 11/2016 | Liu |
| 2017/0117978 A1 | 4/2017 | Ko |
| 2017/0239394 A1 | 8/2017 | Fromm et al. |
| 2019/0081884 A1 | 3/2019 | Spohn |
| 2019/0104056 A1 | 4/2019 | Poorrezaei |
| 2019/0356498 A1 | 11/2019 | Hernandez Sanchez et al. |
| 2020/0162335 A1 | 5/2020 | Chen et al. |
| 2020/0382445 A1 | 12/2020 | Calmon |
| 2021/0194808 A1 | 6/2021 | McCormick |
| 2021/0226879 A1* | 7/2021 | Indiresan ............ H04L 63/1433 |
| 2022/0026519 A1 | 1/2022 | Wu et al. |

FOREIGN PATENT DOCUMENTS

| | | |
|---|---|---|
| CN | 102118456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108353439 A | 7/2018 |
| CN | 108390713 A | 8/2018 |
| CN | 108449774 A | 8/2018 |
| CN | 108989223 A | 12/2018 |
| CN | 110505153 A | 11/2019 |
| CN | 111587580 A | 8/2020 |
| CN | 112260742 A | 1/2021 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Edoardo Benzi et al "Optical Inter-Satellite Communication: the Alphasat and Sentinel-1A in-orbit experience"; SpaceOps Conferences, May 16-20, 2016, Daejeon, Korea; 14th International Conference on Space Operations.

Hemani Kaushal et al. "Optical Communication in Space: Challenges and Mitigation Techniques"; Citation information DOI 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv:1704 00885; Aug. 17, 2018.

"Iridium Next: A Global Effort to Launch the Future of Global Communications"; Apr. 19, 2013 | Featured Stories, Iridium Next.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave. , Ste. 600, Washington, D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) ,Sep. 19, 2013, 5 pages.

McCormick, William Carson et al. U.S. Appl. No. 16/721,171, filed Dec. 19, 2019.

Halabian, Hassan et al. U.S. Appl. No. 16/888,023, filed May 29, 2020.

Ashwood-Smith, Peter et al. U.S. Appl. No. 16/887,675, filed May 29, 2020.

McCormick, William Carson U.S. Appl. No. 16/882,952, filed May 26, 2020.

Akhavain Mohammadi, Mehdi Arashmid, U.S. Appl. No. 17/167,540, filed Feb. 4, 2021.

Akhavain Mohammadi, Mehdi Arashmid U.S. Appl. No. 17/140,668, filed Jan. 4, 2021.

Akhavain Mohammadi, Mehdi Arashmid U.S. Appl. No. 17/117,333, filed Dec. 10, 2020.

* cited by examiner

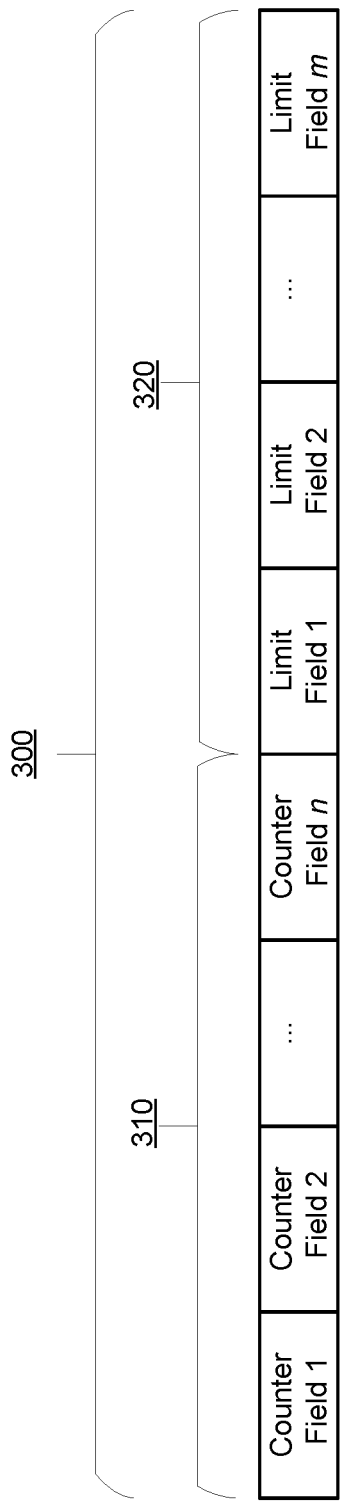
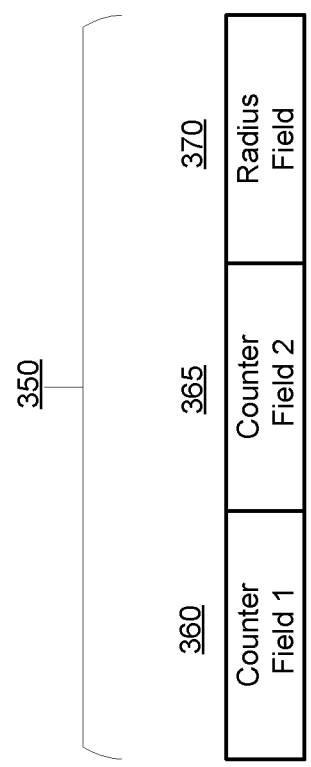
FIG. 3A
FIG. 3B

METHOD AND APPARATUS FOR PROPAGATING NETWORK STATUS UPDATES USING DIRECTIONAL TRACKING

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for propagating network status updates, such as link state advertisements, in a limited region of a network.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

More generally, mobile ad-hoc networks involving rapidly or frequently moving network nodes can be created in which peer-to-peer network connections are subject to significant and rapid change over time. The nodes can be associated, for example, with cars, portable mobile base stations, balloons, drones, satellites, or a combination thereof. The network movement may extend across large geographical areas. Such networks can be referred to as having hyper dynamic network topologies. In such networks, it is challenging to maintain awareness of the current and future available network connections, and thus network routing is problematic. Even if network connections can be predicted, propagating notifications of network events such as link failures can be costly in terms of resource usage, and can be difficult to perform in a timely manner.

In some cases it may be desirable to limit the propagation of network status updates to certain portions of a network. Otherwise large, hyper dynamic networks can become quickly overwhelmed with such notifications. However, currently available mechanisms such as decremented time to live (TTL) counters and incremented hop counters are subject to improvement.

Therefore, there is a need for a method and apparatus for propagating network status updates, such as link state advertisements, in satellite mesh networks and similar networks, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for propagating network status updates, such as link state advertisements or notifications of node or link failures, in a limited region of a network. Network status updates are considered to be messages, such as packet-based messages. The network status updates may be propagated node-to-node via a flooding protocol, as would be readily understood by a worker skilled in the art. The propagation of network status updates is performed using directional tracking approach. More particularly, a network status update carries with it an indication of net distance travelled in one or more directions.

The distance can be a physical distance, such as expressed in units of length. The distance can be an orthodromic or geographic distance, for example. The distance can be a network distance, such as expressed in number of network hops traversed. The distance can be a combination of physical distance and network distance, or a function of such distance. The direction can similarly be a physical direction, a network direction, or a combination thereof. In some embodiments, the network status update carries an indication of distance travelled in at least two directions. In some further embodiments, the distance travelled is a net distance travelled.

The net distance is such that, when the network status update travels in a given direction, the net distance increases, and when the network status update travels opposite the given direction, the net distance decreases. The net distance can be tracked using one, two or more counter fields included in the network status update as a packet. The appropriate counter field or fields can be incremented or decremented, depending on direction travelled, when the network status update packet is communicated between network nodes. That is, the counter fields can be updated when the packet traverses a single node-to-node network hop.

According to some embodiments, there is provided a method for managing network status information in a network. The method is implemented at a network node, for example having a processor, a memory and a network interface and being configured for example through program instructions or electronics hardware to perform steps of the method. The method includes receiving a network status update from another node in the network, the network status update indicative of a change in network conditions. The method includes adjusting content of at least one counter field included in the network status update. The adjusting is based on a direction corresponding to travel of the network status update from the other network node to the network node. The at least one counter field tracks aspects of a net distance travelled by the network status update from an origin thereof. The method includes propagating or refraining from propagating the network status update to one or more further network nodes based at least in part on said content of the at least one counter field either prior to or following said adjusting. In some embodiments, two or more counter fields are present, the contents of which may be adjusted, and the combined contents of which may be used as a basis for determining whether to propagate or refrain from propagating the network status update.

In some embodiments, adjusting content of said at least one counter field comprises increasing a value held in a corresponding one of the counter fields when the direction is a first direction, and decreasing the value held in said corresponding one of the counter fields when the direction is a second direction. The second direction may be opposite the first direction, and thus a given counter field can track net travel along a given axis. In some embodiments, adjusting content of the at least one counter field comprises incrementing or decrementing a corresponding one of the counter fields by one unit to track a net number of hops traversed by the network status update, for example the traversal being along a given axis which corresponding to the counter field. In some embodiments, adjusting content of the at least one counter field comprises increasing or decreasing one or more of the counter fields by one or more amounts representing a net physical distance or network distance traversed by the network status update from said other node. In some embodiments, the at least one counter field comprises a first counter field and a second counter field, and adjusting content of said at least one counter field comprises adjusting a value held in the first counter field when the direction is a first direction, and adjusting a value held in the second counter field when the direction is another direction which is different from, for example orthogonal to, the first direction. In some embodiments, the second direction can be opposite to the first direction. In such embodiments travel in each opposing direction can be tracked, and potentially subtracted to determine a net amount of travel along an axis defined by the two opposing directions. This can be performed for one or multiple axes. Accordingly, in some embodiments, the at least one counter fields include a first counter field tracking distance travelled by the network status update in a first direction, and a second counter field tracking distance travelled by the network status update in a second direction opposite the first direction.

In some embodiments, propagating or refraining from propagating is based on a computation of said net distance based on said content of the at least one counter field. In some further embodiments, the computation of said net distance comprises comparing the net distance to a maximum allowable net distance, and the propagating or refraining from propagating the network status update to one or more further network nodes comprises transmitting the network status update to said one or more further network nodes when the net distance is less than or equal to (or simply less than) the maximum allowable net distance, and refraining from transmitting the network status update to said one or more further network nodes when the net distance is greater than (or greater than or equal to) the maximum allowable net distance. In other further embodiments, there are multiple counter fields, at least one of the counter fields is initialized to a maximum value and decremented due to travel of the network status update in a corresponding direction, the computation of net distance comprises determining if the at least one of the counter fields has reached a zero value, and the propagating or refraining from propagating the network status update to one or more further network nodes comprises transmitting the network status update to said one or more further network nodes when the at least one of the counter fields is above the zero value, and refraining from transmitting the network status update to said one or more further network nodes when the at least one of the counter fields is at the zero value.

According to some embodiments, there is provided a method for managing network status information in a network. The method is performed at a network node. The method includes, in response to a change in network conditions, generating a network status update indicative of said change in network conditions. The network status update includes at least a first counter field and a second counter field, the first counter field for use by subsequent nodes to track travel of the network status update in a first one or more directions, the second counter field for use by subsequent nodes to track travel of the network status update message in a second one or more directions. The method includes transmitting the network status update toward one or more other neighbouring network nodes.

In some embodiments, at least one of the second one or more directions is orthogonal to at least one of the first one or more directions. In some embodiments, the first one or more directions comprise a pair of opposite directions, content of the first counter field being incremented by said subsequent nodes in response to travel of the network status update in one of the pair of opposite directions and content of the first counter field being decremented by said subsequent nodes in response to travel of the network status update in the other of the pair of opposite directions. In some embodiments, the first counter field and the second counter field are initialized to zero, the network status update further comprises at least one field representing a maximum allowable net distance of travel for the network status update, and subsequent nodes compare distance, as tracked by at least the first counter field and the second counter field, to the maximum allowable net distance of travel, and refrain from propagating the network status update when the maximum allowable net distance of travel is reached or exceeded. In other embodiments, the maximum allowable net distance of travel is known a priori to the network nodes, rather than being carried in the network status update. The value can be pre-programmed into each node and can be the same for all nodes or defined on a per-node basis so as to be potentially different for different nodes. In some embodiments, the first counter field and the second counter field are initialized to respective maximum values, and subsequent nodes propagate the network status update when one or both of the first counter field and the second counter field are greater than zero and refrain from propagating the network status update when one or both of the first counter field and the second counter field reach zero.

According to some embodiments, there is provided an apparatus for supporting packet routing by a node in a network. The apparatus is located at a node of the network. The apparatus includes at least one communication interface and processing electronics. The apparatus is configured to receive, by one of the at least one communication interfaces, a network status update from another node in the network, the network status update indicative of a change in network conditions. The apparatus is configured to adjust, based on a direction corresponding to travel of the network status update from the other network node to the network node, content of at least one counter field included in the network status update. The apparatus is configured to propagate or refrain from propagating, using one or more of the at least one communication interfaces, the network status update to one or more further network nodes based at least in part on said content of the at least one counter field either prior to or following said adjusting.

Related embodiments of the present invention provide for a method involving multiple nodes of the network, where plural nodes perform operations commensurate with the above-described method. For example, one, some, or all nodes in a network which are configured to generate network status updates may generate network status updates having multiple counter fields for manipulation by other nodes, and flood the network status updates toward said other nodes. One, some or all nodes in the network can be configured to receive network status updates, adjust one or more counter fields based on a direction of travel of the network status updates, and propagate or refrain from propagating the network status updates based on content of the counter fields.

Related embodiments of the present invention provide for an apparatus for propagating network status updates in a network. The apparatus is located at a node of the network, and includes at least one communication interface and processing electronics. The apparatus is configured to perform operations commensurate with one or more of the above-described methods. The at least one communication interface may include multiple directional communication interfaces configured to communicate with different other network nodes. The direction corresponding to travel of a received network status update can be determined based on which one of the directional communication interfaces received the network status update.

Related embodiments of the present invention provide for a system comprising multiple apparatuses forming a network, where one, some or all of the apparatuses are configured as described above.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 3A illustrates a portion of a network status update packet header, according to embodiments of the present invention.

FIG. 3B illustrates a portion of a network status update packet header, according to other embodiments of the present invention.

It will be noted that throughout the appended drawings, like features are identified by like reference numerals.

DETAILED DESCRIPTION

Figure 1:
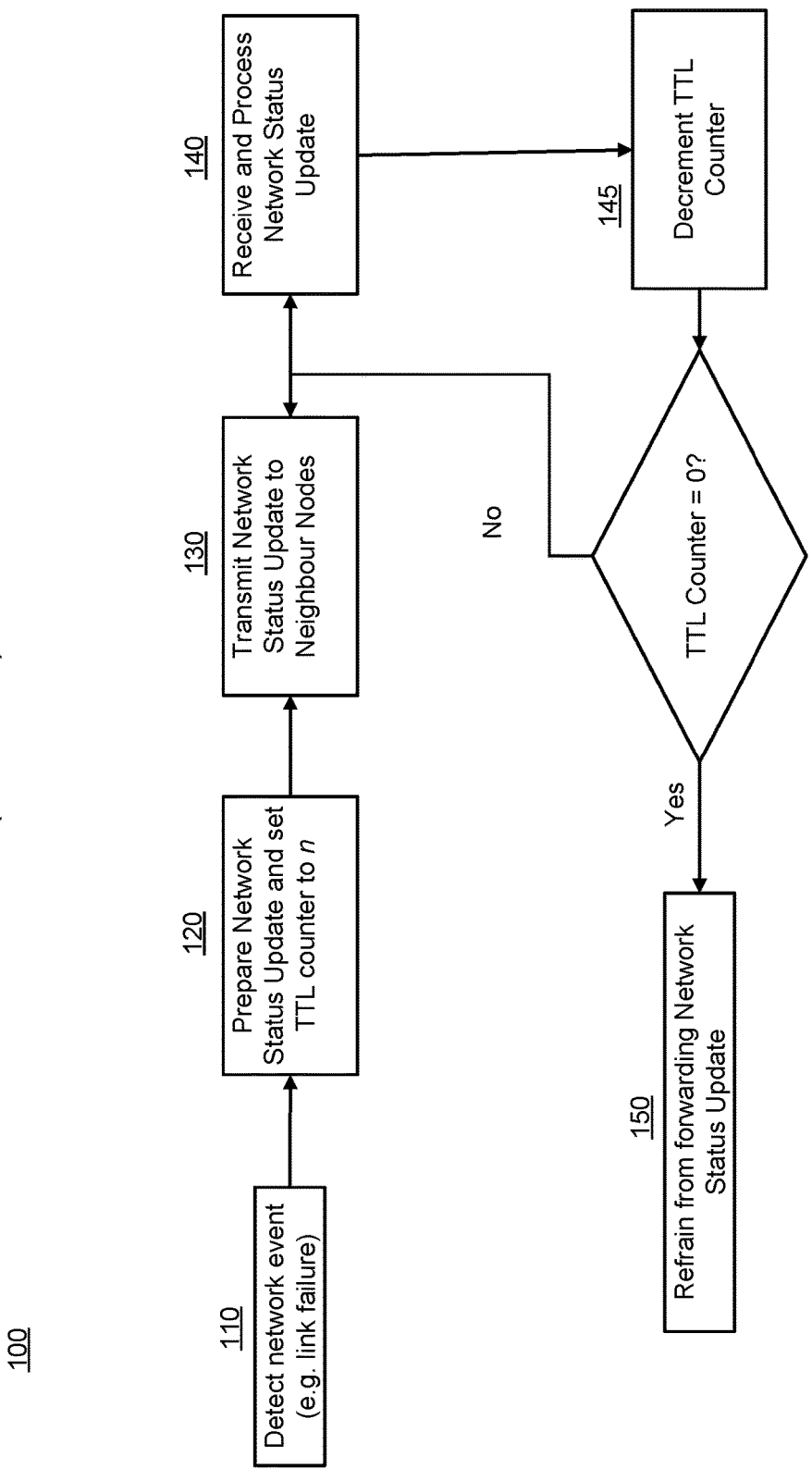
FIG. 1 illustrates an approach for limiting flooding messages for comparison with embodiments of the present invention.

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the $3^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam e.g. in a polar constellation, or between multiple seams in a Walker Delta constellations, the size of network, and the requirement to timely communicate network changes to all nodes as they occur.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "Walker Delta constellation". Walker Delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, attributes the network topology in satellite networks is considered to change dynamically. The impact of network topology changes, link failures and link creations, link level optical impairments as well as Doppler Effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time. Flooding is a mechanism by which network nodes, such as satellites, propagate notifications of a network event, such a link failure, to other network nodes. Such notifications are referred to herein as network status updates. In particular, the network node initially detecting the network event notifies its neighbour nodes, which in turn may notify their neighbour nodes, and so on.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status update messaging (e.g. via flooding) is time consuming, network convergence is relatively slow. When network status changes are frequent, this can result in network information at each node failing to adequately track the actual network state.

In networks involving mobile nodes, such as LEO satellite nodes, the relative motion of satellites with respect to each other, ground nodes, or both, can result in time-varying network topology and link availability. Maintaining routing tables and link state information globally therefore becomes a challenging task. It is therefore useful to consider alternative routing methods, which can be implemented using limited information. The limited information may include node location and link state information for only those nodes in a local neighbourhood of a given node making a routing decision.

For example, when using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite.

Embodiments of the present invention provide for a method, apparatus and system for propagating network status updates, for example for use in supporting packet routing in a network. The network may be a hyper dynamic network, for example. Packet routing support can include at least maintaining of network status information that can be used for routing support. The network status information can be maintained (kept up-to-date) using network status updates communicated between network nodes, for example via flooding protocols. Packet routing includes determining a path through the network which the packet is to be forwarded along, and transmitting the packet to a node along that path, for example by forwarding it to the next hop node along the path.

Embodiments of the present invention address network routing support challenges in the context of satellite networks. Specific focus is in the application to non-terrestrial massive (satellite) polar and Walker-Delta constellation networks in order to provide global communications services that may not be supported by terrestrial (e.g. wire line or fibre-based) networks. The networks may be flat, i.e. non-hierarchical, without necessarily being separated into multiple routing areas. Various embodiments provide for a flat network routing paradigm in which each network node is only required to have limited knowledge of network conditions, for at least some portions of the network. This limits the requirement to propagate network status updates (e.g. via flooding link status update messages) through the network. In particular, in various embodiments, network status updates (e.g. in the form of link state advertisements) are communicated locally to a limited set of other nodes (e.g. defined based on the node generating the update initially). The network status updates may indicate availability of communication links between nodes. Network status updates generated by some nodes in the network therefore do not necessarily reach other (e.g. far away) nodes of the network. This allows each node of one or more nodes to maintain network status information for a limited region of the network which is communicatively coupled to that node. It is noted that embodiments of the present invention are not necessarily limited to satellite networks. Embodiments can be applied to fixed or mobile terrestrial networks, or combination terrestrial and satellite networks.

According to various embodiments of the present invention, the dissemination of network status information is managed by tracking the directional propagation of network status updates and restricting such propagation to a limited region. The limited region may be a region of a network or a spatial or geographic region. As will be readily understood, network status updates are generated and transmitted (e.g. via a limited flooding mechanism) in order to inform nodes of a change in network conditions, such as a link failure. The propagation typically refers to a series of node-to-node transmissions (and corresponding receptions) of the update.

The network status update is generated having one, two or more counter fields. These may be fields in the header of a packet carrying the network status update, for example. The contents of these counter fields is adjusted by subsequent nodes upon receipt (and potentially forwarding) of the network status update. The counter fields are thus comparable to, but substantially different from, a packet's time-to-live (TTL) field or hop counter field. In particular, a recipient node receiving the network status update adjusts the contents of the counter fields based on a direction corresponding to travel of the network status update from the immediately previous transmitting node to the recipient node.

In some embodiments, the contents of a counter field are either incremented or decremented depending on the direction. The contents of different counter fields can be incremented or decremented in different ways depending on the direction. The contents of the counter fields may be adjusted, by each node in receipt of the corresponding network status update, in such a manner that the counter fields track aspects of a net distance travelled by the network status update from an origin of the network status update (e.g. the node which initially generated the network status update).

For example, assuming a substantially grid-like network, when the network status update travels eastward to reach the recipient node, a first counter field tracking east-to-west net travel distance can be incremented, e.g. by one unit. When the network status update travels westward to reach the recipient node, the first counter field can be decremented, e.g. by one unit. When the network status update travels northward to reach the recipient node, a second counter field tracking north-to-south net travel distance can be incremented, e.g. by one unit. When the network status update travels southward to reach the recipient node, the second counter field can be decremented, e.g. by one unit.

More generally, in various embodiments, when the network status update travels in a first direction, the content of a counter field can be increased (e.g. by one unit). When the network status update travels in a second direction, the content of the same counter field can be decreased. The second direction may be opposite to the first direction, and thus the counter field may track net distance travelled along a given axis. Additionally or alternatively, when the network status update travels in a third direction, the content of another counter field can be increased. Yet further, when the network status update travels in a fourth direction, the content of the same other counter field can be decreased. The third direction can be orthogonal (e.g. spatially perpendicular) to the first direction. The fourth direction can be opposite to the third direction, and thus the other counter field may track net distance travelled along a different given axis.

For further clarity, a corresponding axis can be defined for each opposing pair of directions. For example, the above-mentioned first and second directions can correspond to a first axis. The above-mentioned third and fourth directions can correspond to a second, different axis. A counter field that is incremented in response to travel in one direction (e.g. the first direction) and decremented in response to travel in the opposite direction (e.g. the second direction) can then be said to track net travel of the network status update along a given axis. A pair of counter fields, one of which is incremented in response to travel in one direction (e.g. the first direction) and the other of which is incremented in response to travel in the opposite direction (e.g. the second direction) can likewise be said to track net travel of the network status update along a given axis.

Figure 3C:
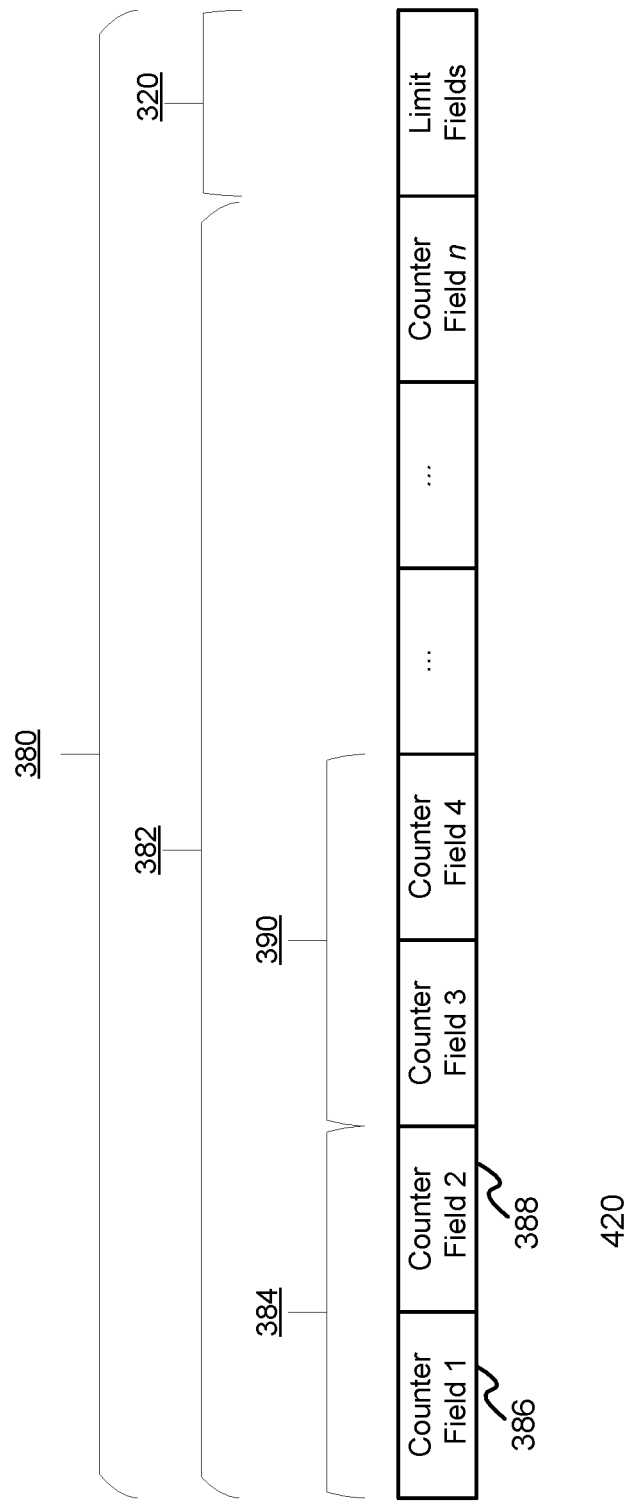
FIG. 3C illustrates a portion of a network status update packet header, according to other embodiments of the present invention.

In some embodiments, the counter field or fields which are adjusted (e.g. incremented or decremented) are determined based on the direction. In contrast to the above embodiment, the determined counter field(s) may always be adjusted in the same manner, i.e. always incremented or always decremented. Accordingly, each counter field can, for example, track a time-to-live or hop count for a particular direction or set of directions. For example, when the network status update travels in one of a first plurality of directions (e.g. either north or south), a first (e.g. north/south) counter field can be decremented. When the network status update travels in one of a second plurality of directions (e.g. either east or west), a second (e.g. east/west) counter field can be decremented. In another embodiment, the counter fields are always incremented. The first plurality of directions may, but does not necessarily include, two opposite directions. The first plurality of directions and the second plurality of directions may be disjoint sets of directions. FIG. 3C illustrates an example of such an embodiment.

It is observed that a node may adjust contents of the counter fields based on both the current content(s) in the counter fields and the direction corresponding to travel of the network status update. This is the case for example when the counter fields are incremented or decremented, because the current contents are taken as a starting point for the incrementing or decrementing.

Incrementing or decrementing the counter field by one unit at a time allows the net number of hops (e.g. a net distance measured in terms of hops) traversed by the network status update in one or more directions to be tracked. Alternatively to incrementing or decrementing a counter field by one unit per hop, a recipient node can adjust the counter field by another amount, for example an amount proportional to the (e.g. straight-line) distance travelled by the network status update from the immediately previous transmitting node to the recipient node.

The term "direction" can refer to a physical direction in space, a direction defined (e.g. arbitrarily) and used for orientation in a space or in a network, a direction in a coordinate system, or another arbitrary definition following one or more predetermined rules. One such rule may be that there are at least two opposing directions, where travel in one of the two opposing directions tends to cancel out travel in the other of the two opposing directions, and net travel can be determined by subtraction of total (net) travel in one of the opposing directions from total travel in the other of the opposing directions. Travel in either of two opposing directions can correspond to travel along a single axis. Another such rule is that there can be at least two orthogonal directions, such that travel in one of the orthogonal directions does not affect net travel in another one of the orthogonal directions. Travel in different orthogonal directions can correspond to travel along different orthogonal axes. When referring to a single pair of opposing directions, the term "net travel" refers to total amount of displacement, accounting for travel in one direction potentially being cancelled out by travel in an opposing direction. When referring to multiple non-opposing directions, such as orthogonal directions, the term "net travel" can refer to a total amount of distance traveled for example as computed in accordance with Equation (1).

Directions can be, for example, "north" and "south;" "north," "south," "east" and "west;" "north," "south," "east," "west," "up," "down;" "clockwise," "counter-clockwise," "radially in," "radially out;" "up," "down," left," "right," "forward," "backward," etc. Directions may be referred to using such terms for the sake of clarity. Such terms are not intended to be limiting, but may be descriptive of various scenarios and embodiments. Additional non-orthogonal directions can be included, such as northeast, southeast, southwest, northwest, for example. Opposing non-orthogonal pairs directions can correspond to different non-orthogonal axes. Directions can be defined relative to an external coordinate system (e.g. in the case of north, south, east, west) or relative to an internal coordinate system (e.g. in the case of left, right, forward, backward). North, south, east and west may refer to directions in a planar topology, directions in a spherical topology, or directions in another (e.g. cylindrical or toroidal) topology. Directions can be treated as formal values which may or may not correspond to physical or network location. In some embodiments, directions may be provided as pairs of opposites, such that travelling in one direction and travelling in the opposite direction tend to cancel each other out. Different pairs of directions can be (but are not necessarily) orthogonal, such that travelling in a first direction affects the total cumulative travel, but does not affect the cumulative travel in any direction which is orthogonal to the first direction.

In some embodiments, a network status update may travel in a direction which is a combination of two or more directions, the two or more directions being tracked by different counter fields. For example, a network status update may be received via a directional interface which is oriented in the northwest direction, where one counter field tracks north-to-south travel and another counter field tracks east-to-west travel. In such cases, multiple ones of the counter fields can be adjusted, for example concurrently, by the node receiving the network status update. Thus, even if different counter fields track travel in orthogonal directions, the network status updates are not necessarily restricted to travel in one orthogonal direction at a time.

Prior to or following the adjusting of the counter fields, the recipient node determines whether to further propagate the network status update to further nodes, or to refrain from such propagation. The determination is made based at least in part on content of the counter fields. The determination can be based on a computation of a net distance travelled by the network status update from an origin thereof, which is tracked using the counter fields. For example, the determination can be made based on whether the current contents of the counter field indicate that the network status update has not traveled outside of a region centered at its origin and having predetermined radius or other relative boundaries. If the determination is made prior to adjusting the counter fields, and the determination is to not propagate the network status update, then the adjusting of the counter fields can be omitted.

In various embodiments, computing the net distance travelled includes comparing the net distance to a maximum allowable net distance, for example as indicated by a predetermined threshold. The propagating or refraining from propagating action then includes transmitting the network status update to further network nodes when the net distance is less than or equal to the maximum allowable net distance, and refraining from transmitting the network status update to said one or more further network nodes when the net distance is greater than the maximum allowable net distance.

In some embodiments, assuming the counter fields are initialized to zero, the net distance can be determined by performing a norm or distance computation on the counter fields, treated as a displacement vector. The propagation can then be performed if the computed norm or distance is less than or equal to a threshold value T, and the network status update can be discarded otherwise. The distance computation can be a Euclidean norm (L2 distance) computation, or an Lp distance computation for some value of p. Lp distance is computed using the formula:

$$\text{Distance} = \left( \sum_{i=1}^{N} |x_i|^p \right)^{1/p}, \quad (1)$$

where N is the number of counter fields and $x_i$ is the content of the $i^{th}$ counter field. When p=2, such an embodiment limits the network status update so that it is confined to a particular substantially circular, spherical or hyperspherical region. By multiplying the $x_i$ in the above equation by different predetermined weighting constants $a_i$, the network status updates can be confined (when p=2) to substantially elliptical, ellipsoidal or hyper-ellipsoidal regions. Other boundary conditions are also possible. For example, by propagating the network status update only $|x_i|<T_i$ for each i from 1 to N, the network status update can be confined to a region corresponding to a rectangle, rectangular prism, or hyper-rectangular prism. It is noted that formally taking p=∞ in Equation (1) yields the uniform or sup norm which is appropriate to such a condition. Taking p=1 may also be a useful metric, making the distance the sum of net distances travelled in each of a plurality of orthogonal directions. Various other boundaries can be enforced by imposing other suitable conditions.

If the counter fields are initialized to a non-zero value, a variation of Equation (1) can be used, for example in which $x_i$ is replaced with the difference between the $i^{th}$ counter field and its initial value. This may be applicable for example where one or more counters are implemented as directional TTL fields.

It is considered that a counter field can convey both positive and negative values by suitable encoding using a signed number representation, such as a sign-magnitude representation, a one's complement representation, a two's complement representation, an offset binary representation, or a base −2 representation. In some embodiments, a counter field is configured to convey positive values only, and pairs of counter fields are used to track travel in opposing directions, the contents of these pairs being subtracted to determine net distance. Such embodiments may be more suitable in some implementations where it is more expedient for hardware purposes to avoid signed number representations.

As mentioned above, rather than tracking a net distance by incrementing a counter field in response to travel in one direction and decrementing the same counter field in response to travel in the opposite direction, a cumulative distance can be tracked. When cumulative distance is tracked, multiple counter fields are used, and at least one counter field is always incremented (or always decremented). Multiple counter fields may track multiple cumulative distances in different sets of directions. In this case, determining whether to propagate or refrain from propagating the network status update can be based for example on whether one of the counter fields has reached a predetermined maximum or minimum value, or whether a set number (e.g. all) of the counter fields has reached a predetermined maximum or minimum value, or whether the sum or other function of the counter fields has reached a predetermined maximum or minimum value. FIG. 3C below illustrates an example of such a scenario.

For example, a first counter field and a second counter field may be provided in the network status update. A value held in the first counter field can be increased (e.g. incremented) when the direction of travel of the network status update to a node belongs to a first set of directions (e.g. a first direction and its opposite, which correspond to one axis). A value held in the second counter field can be increased when the direction of travel of the network status update to a node belongs to a second set of directions (e.g. a second direction orthogonal to the first direction, and the opposite to the second direction, which correspond to another axis). Rather than being increased, the values can be decreased (e.g. decremented).

Measures can also be taken to mitigate the possibility that a network status update circulates within a limited region indefinitely. For example, every network status update can be provided with an identifier, and nodes can be configured so that they only forward a particular network status update a maximum number of times (e.g. only once). Separate time-to-live counters or hop counters can also be used for this purpose.

In various embodiments, a node has multiple interfaces, for example each supporting a different inter-satellite link. The interfaces can be radiofrequency or optical (e.g. communication laser or free space optical) interfaces. The interfaces can be configured to transmit, receive, or both transmit and receive signals which propagate in free space, via a cable or waveguide, or via another medium. The interfaces can be directional in nature, such that the interface facilitates communication between two nodes via a narrow point-to-point beam. Such interfaces are also referred to as directional communication interfaces. Different directional communication interfaces of a node can be oriented in a different direction, in order to communicate with a different network node located in that direction. Each interface may be associated with its own specific set of communication components. In some embodiments, at least some communication components, such as a processing engine, are shared by multiple interfaces of the node. A node may have an arbitrary number of interfaces. In example embodiments as described herein, each node has four interfaces, each configured to communicate in a different direction, such as north, south, east and west. However, this is not intended to be limiting. Some or all satellite nodes configured in this manner can also have satellite-to-ground interfaces. Some or all satellite nodes can have communication interfaces to satellites orbiting at another altitude.

When directional communication interfaces are used, a node can identify the direction of travel of a network status update based on which interface the network status update was received on. For example, when the network status is received on a directional communication interface facing east and communicating with another network node in the east direction, the network status update can be determined to travel westward from the network node in the east.

It is contemplated that other types of interfaces between nodes may also be used. For example, nodes can communicate by broadcast or via a shared, multi-access channel. In some embodiments, a single physical interface may be used along with a multiplexer/demultiplexer arrangement to allow one node to communicate with multiple other nodes. In such cases, a node can identify the direction of travel of a network status update based for example on contents of the update. For example, the update can include an indication of location of the node transmitting the update, which a receiving node can compare to its own location to determine direction of travel. As another example, nodes can track locations of other network nodes, the update can include an indication of the node transmitting the update, and a node receiving the update can determine the direction of travel of the update by looking up the location of the node transmitting the update, and comparing this location to its own location.

It is noted that a particular interface may be capable of transmission, reception, or both transmission and reception. For example, in some cases a previously bidirectional interface may be limited to reception capabilities only, due to failure of transmission components.

FIG. 1 illustrates a conventional approach 100 for limiting the multi-hop propagation range of a network status update. This approach uses a time-to-live (TTL) counter carried in a packet header (e.g. protocol header) of the network status update. According to FIG. 1, a first node detects 110 a network event, such as a link failure. The first node then prepares 120 a network status update as a message packet, and sets a TTL counter in a header of the message packet to a desired value n. This value reflects the desired maximum radius of a region to which the network status update will be confined. The first node then transmits 130 the network status update to all of its neighbour nodes in the network. A node in receipt of the transmitted network status update processes 140 the network status update. The node decrements 145 the TTL counter by one. That is, the TTL counter's value as received is rewritten so that it is one less than the value as received. If the TTL counter after adjustment reads zero, the node refrains 150 from forwarding the network status update and the flooding process terminates. If the TTL counter after adjustment is greater than zero, the node performs the transmission 130 and the process repeats at subsequent nodes, with the updated value of the TTL counter. Accordingly, the network status update does not propagate more than n hops from its origin. This is useful for certain systems because it reduces the number of network status updates in the network at a given time, and thus reduces overhead requirements and resources requirements for propagating network status updates.

However, the approach of FIG. 1 is subject to improvement. Link events can have a direct impact on whether a network status update can reach a particular node via flooding. For example, if a single TTL counter or hop counter is used to limit propagation of network status updates, and a link has failed between the source of the network status update and a necessary destination node, the network status update is not guaranteed to reach its necessary destination. The TTL counter may be set too low, or the hop limit may be set too high, to allow for this. By using multiple counters for different directions, or by incrementing or decrementing a counter depending on the current direction of travel of a message, or both, this problem can be mitigated.

Furthermore, regarding the approach of FIG. 1, the TTL counter was originally intended simply to stop messages from circulating in a network indefinitely, not to restrict messages to a certain area. If a message takes a meandering path through the network, a TTL counter on its own will cause the packet to be discarded before it reaches the edge portions of a desired area. For example, referring to FIG. 4, if the TTL counter is set to two, a network status update from node B 410 would not reach node A 420, because there is no two-hop path between these two nodes due to the link failure 417. A hop counter (which increments instead of decrements) is subject to the same problems. By using multiple counters for different directions, or by incrementing or decrementing a counter depending on the current direction of travel of a message, or both, it is contemplated that a message, such as a network status update, can potentially be more effectively confined to a desired area.

It is noted that the term "TTL counter" as used herein, when referring to the prior art, refers to a counter such as is implemented in an IP protocol, and which decrements in a direction-agnostic manner as a packet is propagated. In contrast, when the term TTL counter is used to describe embodiments of the present invention, it typically refers to a counter field which is decremented in a direction-dependent manner. The TTL-like counter implemented in embodiments of the present invention is typically not the same TTL counter which may be included in a packet that the present invention is encapsulating. For example, a network status update may include an IP packet which is encapsulated within a further packet, the further packet having TTL-like counter fields which are separate from the IP packet's TTL counter.

Figure 2:
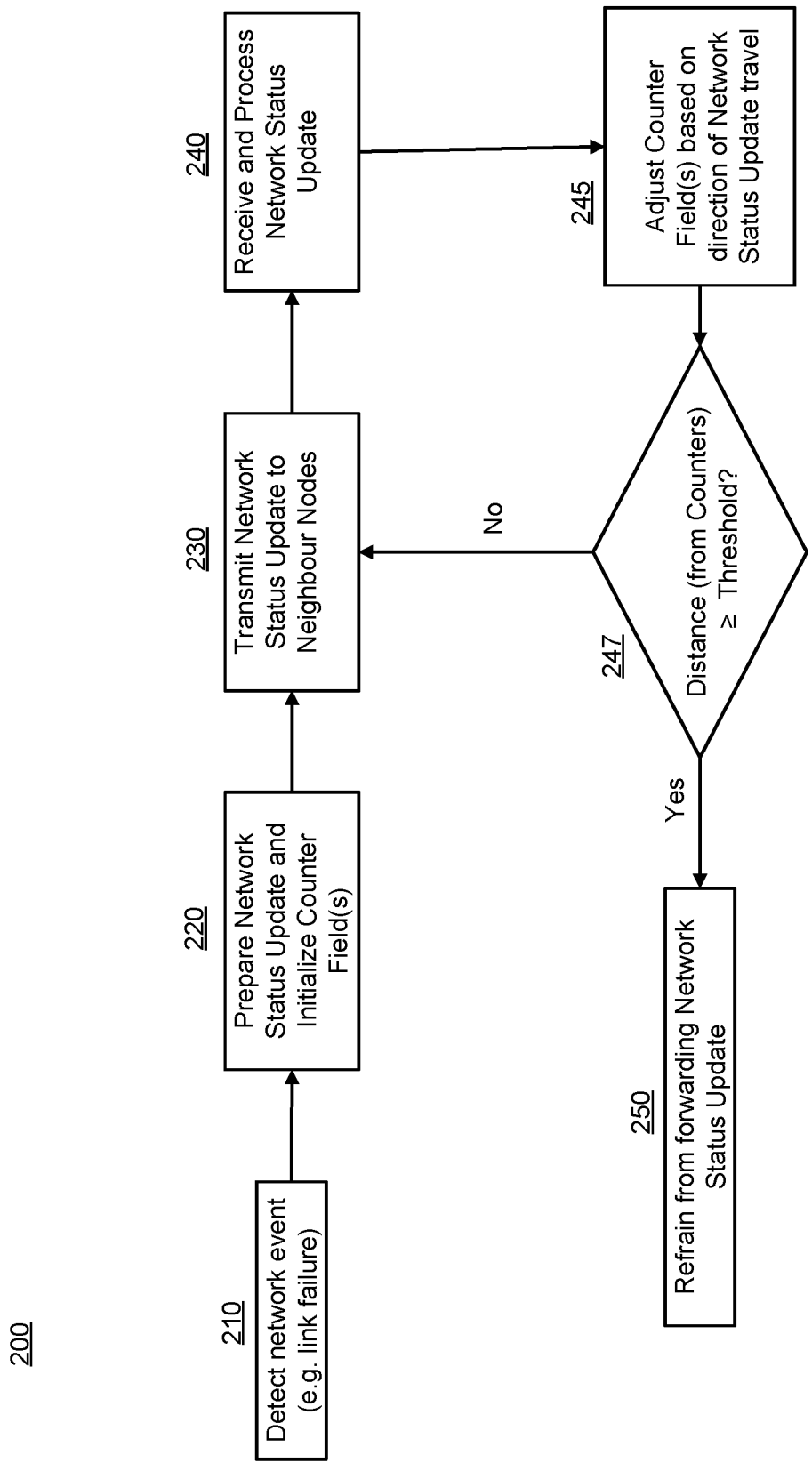
FIG. 2 illustrates an approach for limiting flooding messages according to embodiments of the present invention.

FIG. 2 illustrates an approach 200 for limiting the multi-hop propagation range of a network status update, according to an example embodiment of the present invention. According to FIG. 2, a first node detects 210 a network event, such as a link failure. The first node then prepares 220 a network status update as a message, and initializes one or more counter fields in the message (e.g. in the header thereof) to predetermined values, e.g. zero or a maximum value. The first node may also initialize a radius or threshold field to a predetermined value, indicative of a desired distance of travel of the network status update in the network. The first node then transmits 230 the network status update to all of its neighbour nodes in the network.

A node in receipt of the transmitted network status update processes 240 the network status update. The node adjusts 245 content of at least one of the counter fields, based on a direction corresponding to travel of the network status update from the other network node to the network node. For example, if the network status is received via a north-facing interface, one of the counter fields tracking north-to-south travel can be decremented. If the network status is received via a south-facing interface, the same one of the counter fields tracking north-to-south travel can be incremented. If the network status is received via an east-facing interface, another one of the counter fields tracking east-to-west travel can be decremented. If the network status is received via a west-facing interface, the same other one of the counter fields tracking east-to-west travel can be incremented.

The node then calculates the distance travelled by the network status update, for example according to Equation (1) above. The node compares 247 the distance (calculated based on the contents of the counter fields) to a threshold. If the distance is greater than or equal to a threshold T, node refrains 250 from forwarding the network status update and the flooding process terminates. If the distance is less than the threshold T, the node performs the transmission 230 and the process repeats at subsequent nodes, with the updated value of the counter field(s). Accordingly, the network status update does not propagate more than a distance T from its origin. This is again useful for certain systems because it reduces the number of network status updates in the network at a given time, and thus reduces overhead requirements and resources requirements for propagating network status updates. Furthermore, the distance is tracked in a different, potentially improved manner relative to the case of FIG. 1. For example, network status updates are more freely mobile within a specified region, because they can take meandering paths through the region without being discarded. As another example, control over the region boundaries is potentially improved because one is not limited to a simple radius or hop count setting. Embodiments of the present invention may take the multi-directional nature of flood propagation of network status updates into account while inhibiting the network status updates from crossing defined boundaries.

FIG. 3A illustrates a portion 300 of a packet header included in a network status update, according to an embodiment of the present invention. The packet header portion can be included, potentially along with other parts of a packet header and a data field, of a packet which conveys a network status update, according to embodiments of the present invention. The portion 300 includes one, two or more counter fields 310 (illustrated as n counter fields). The counter fields can be initialized to a predetermined value (e.g. zero) upon initial generation of the network status update. The counter fields can be adjusted by subsequent nodes in receipt of the network status update. The portion 300 may include, but does not necessarily include, one, two or more limit fields 320 (illustrated as m limit fields). The limit fields can be set upon initial generation of the network status update, and can convey information indicative of the boundaries of a region to which the network status update is to be restricted. For example, a single limit field can be used to indicate radius of a circular region, centered at the node which generated the network status update. The limit field can indicate the total allowable number of hops the network status update can travel. Multiple limit fields can be used to indicate the boundaries of more complex regions, such as ellipses, ellipsoids, rectangles, rectangular prisms, etc. Alternatively to limit fields carried in packets, network nodes may be pre-configured with suitable limits to enforce.

FIG. 3B illustrates portion 350 of a packet header which represents a simplified version of FIG. 3A, with two counter fields 360, 365 and a radius field 370. The radius field may, in some embodiments, be a field indicating the total maximum allowable number of hops. The radius field is an example of a limit field 320 and is excluded in some embodiments. The first counter field 360 is used to track "vertical" travel of the network status update, and is adjusted when the network status update travels "vertically." The second counter field 360 is used to track "horizontal" travel of the network status update, and is adjusted when the network status update travels "horizontally." The terms "vertical" and "horizontal" are used for simplicity, but can refer to arbitrary directions in a network, or physical directions such as north-to-south (vertical) and east-to-west (horizontal). The radius field 370 is set during initial generation of the network status update and indicates the threshold T to which the values of the counter fields, in combination, are compared, in order to determine whether to propagate or refrain from propagating the network status update. In some embodiments, the radius field is not adjusted from its initial setting. In other embodiments, the radius field can be adjusted, for example intermittently. Such adjustment can be used for example to gradually reduce the radius field in order to inhibit continued propagation of the packet, similarly to a TTL field.

FIG. 3C illustrates a certain embodiment of FIG. 3A in more detail. A portion 380 of a packet header includes counter fields 382 and optionally also limit fields 320. The counter fields 382 include a pair 384 of counter fields, which are a first counter field 386 tracking distance travelled by the network status update in a first direction and a second counter field 388 tracking distance travelled by the network status update in a second direction opposite the first direction. The counter fields are always incremented (or always decremented). A net distance travelled along an axis defined by the first and second directions can be determined by subtracting the values in the first and second counter fields. One, two or more pairs of such counter fields can be provided. Another pair 390 of counter fields is also shown. Different pairs of counter fields can track travel in different pairs of opposing directions, i.e. along different axes which may be orthogonal to one another. For example, pair 384 can track travel of the network status update in the east and west directions and pair 390 can track travel of the network status update in the north and south directions.

Figure 4:
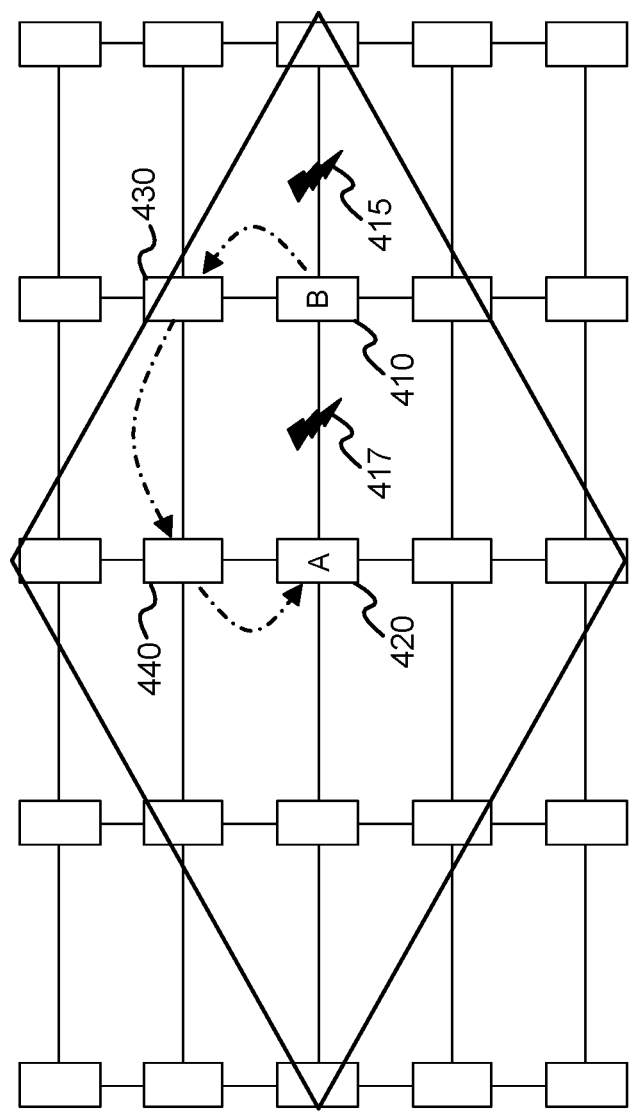
FIG. 4 illustrates multi-hop propagation of a network status update according to an example embodiment of the present invention.

FIG. 4 illustrates multi-hop propagation of a network status update according to an example embodiment of the present invention. The network status update uses the header of FIG. 3B, with the radius field set to 2. The counter fields are initialized to zero. When the network status update travels north by one hop, the first "vertical" counter field is incremented by one, and when the network status update travels south by one hop, the first counter field is decremented by one. When the network status update travels east by one hop, the second "horizontal" counter field is incremented by one, and when the network status update travels west by one hop, the second counter field is decremented by one. An L1 distance metric (p=1 in Equation (1)) is used by each node to evaluate whether to propagate or refrain from propagating the network status update. Nodes are configured to propagate network status update messages which have travelled up to and including two units of distance in the L1 metric, and to refrain from propagating network status updates which have travelled more than two units of distance.

In the example of FIG. 4, network node B 410 generates the network status update and transmits it to all neighbouring nodes. The network status update is generated in response to detecting failure of a link 415. Failure of another link 417 between node B 410 and node A 420 is assumed to have already occurred. The propagation of one instance of the network status update from node B to node A is shown. A network status update can indicate link failure, link establishment, link re-establishment, node failure or node recovery, or another outage, change or recovery event.

A copy of the network status update first travels north to node 430. Upon receipt, node 430 determines that the network status update has travelled north, and increments the first counter field by one. The second counter field is unchanged. The node 430 computes the L1 distance metric following adjustment of the counter fields. In this case, the content of the first counter field is '1' and the content of the second counter field is '0', so |1|+|0|=1 is the L1 distance, which is less than the radius field value of 2. Therefore the node 430 propagates (transmits) the network status update to all of its neighbour nodes (except the node which it received the network status update from, i.e. node B 410).

A copy of the network status update then travels from the node 430 westward to the node 440. Upon receipt, node 440 determines that the network status update has travelled west, and decrements the second counter field by one. The first counter field is unchanged. The node 440 computes the L1 distance metric following adjustment of the counter fields. In this case, the content of the first counter field is '1' and the content of the second counter field is '−1', so |1|+|−1|=2 is the L1 distance, which is equal to the radius field value of 2. Therefore the node 440 propagates (transmits) the network status update to all of its neighbour nodes (except the node which it received the network status update from, i.e. node B 430).

A copy of the network status update then travels from the node 440 southward to the node A 420. Upon receipt, node A 420 determines that the network status update has travelled south, and decrements the first counter field by one. The second counter field is unchanged. The node A 420 computes the L1 distance metric following adjustment of the counter fields. In this case, the content of the first counter field is '0' and the content of the second counter field is so |0|+|−1|=1 is the L1 distance, which is less than the radius field value of 2. Therefore the node A 420 propagates (transmits) the network status update to all of its neighbour nodes (except the node which it received the network status update from, i.e. node B 440). At this point, the node A has received the network status update. It is noted that the present invention has allowed the network status update to reach node A from node B, despite the existing link failure 417. This might not have been feasible using a single TTL or hop count field.

In some embodiments, rather than tracking a net distance travelled and comparing it to a maximum allowable distance, a network status update may be initialized with one or more directional TTL fields. The TTL fields may be set to a maximum value. One of the TTL fields may be decremented when the network status update travels in a first direction. In some embodiments, the same one of the TTL fields may be incremented when the network status update travels opposite the first direction. In some embodiments, another one of the TTL fields may be decremented when the network status update travels in a second direction which is different from (e.g. orthogonal to) the first direction. In some embodiments, the same other one of the TTL fields may be incremented when the network status update travels opposite the second direction. In some embodiments, the TTL field may be incrementable only to a predetermined maximum value. In some embodiments, the predetermined maximum value may be treated the same as the zero value as discussed below.

Once one of the TTL fields reaches zero, nodes may be inhibited from transmitting the network status update in at least one direction. For example, nodes may be inhibited from transmitting the network status update in the direction that corresponds to decrementing of this TTL field. In some embodiments, once one of the TTL fields reaches zero, nodes may be inhibited from further transmission of the network status update.

In various embodiments, by implementation of a suitable distance measurement or other criterion, network status updates can be inhibited from propagating by certain amounts in certain directions, while being allowed to propagate in other directions. For example, a node can refrain from propagating a network status update further northward when a TTL field tracking north-south travel reaches zero, while still propagating the network status update eastward and westward.

Further propagation, and propagation of other copies of the network status update continues similarly. However, in various embodiments, when each node has already received a copy of the network status update, it refrains from propagating further copies of the same network status update, thus mitigating unnecessary further messaging. This can be facilitated by including a substantially unique identifier in each network status update, checking based on the identifier whether the network status update has previously been propagated, and refraining from propagating the network status update a second time if it has previously been propagated. This approach can be used to support implementations of limited flooding regions, as described for example below. This approach can be used to overcome asymmetries between data and control planes when there are changes in link status.

Embodiments of the present invention can be used in conjunction with methods and apparatus for packet forwarding in networks with limited information. Potentially applicable methods are described for example in U.S. patent application Ser. Nos. 16/888,023 and 16/887,675, which are hereby incorporated herein by reference. Generally speaking, a network node retains network status information for a limited region, i.e. less than all, of a network. In the present case, this is achieved at least in part by limiting the propagation of network status updates as described elsewhere herein. Network status updates can be propagated within a limited "flooding region" which includes the limited "routing region," for example such that the flooding region has approximately twice the radius of the routing region. When the node is required to transmit or forward a packet to a destination outside of its limited routing region, it can select a target node within its routing region of the network that is "closer to" the destination and transmit the packet toward this target node. In some cases, the packet destination can be identified in part by its physical (e.g. geographic, spatial or spatio-temporal) location, and the physical locations of nodes within the limited region of the network can be tracked by the network node. In this case, the node can select the target node as a node which is physically closer to the destination, based on this physical location information. The node then forwards the packet toward the target node along a determined, typically multi-hop, network path. The determined network path typically lies fully within the routing region of the network as seen by the node. The process can be repeated by the target node upon receipt, by intermediate nodes between the node and the target node (upon receipt of the packet), or a combination thereof. According to this approach, routing is performed over portions of the network which the network node has full awareness for, even though no network node necessarily has full awareness for the entire network. In this manner, nodes restrict the routing of packets so that packets are routed only toward network nodes in a limited routing region, typically coinciding with or included within a region for which the node maintains full network status information.

Geographic routing may be implemented in support of such packet forwarding. That is, the physical or network location of a packet's destination can be specified in such a manner that a node can determine which node(s), among those in its limited routing portion of the network, are relatively closer to the packet's destination. This can be performed even without having information regarding the status of the part of the network near the packet's destination. For example, the packet's destination can be specified using geographic coordinates, and each node can maintain an indication of geographic coordinates of all nodes in its own limited routing portion.

According to various embodiments of the present invention, the size of each node's flooding region is set to be approximately twice the size of the node's routing region, or at least twice the size of the node's routing region. Other size settings are also possible. As mentioned above, a node's routing region corresponds to a region of the network, typically less than the entire network, such that a node routes packets toward other nodes falling within its routing region. The flooding region corresponds to the limited region in which a network status update is propagated, by use of the multiple counter fields as described above. A region size may correspond to the radius or diameter of the region, for example, or other suitable dimensions such as width in one or more directions. It is considered that setting the flooding region to be twice the size of the routing region will facilitate nodes having full awareness of network conditions in their routing regions, given certain assumptions.

According to some embodiments of the present invention, the flooding region can be maintained so that it matches or encompasses the routing region, even when node or link failures are present. This is useful so that routing is performed with adequate network status awareness.

Figure 5:
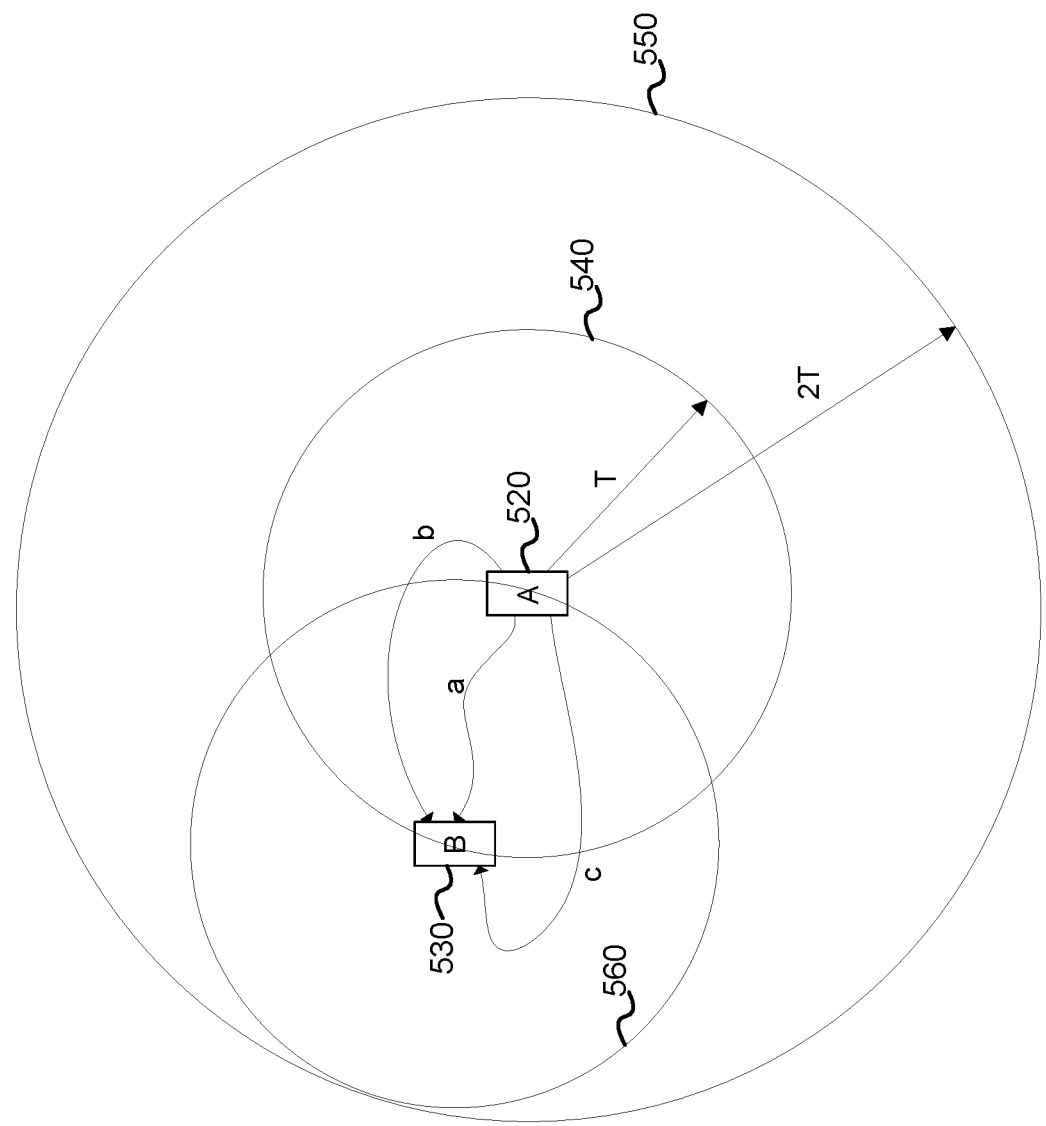
FIG. 5 illustrates considerations for sizing of flooding regions according to embodiments of the present invention.

FIG. 5 demonstrates this situation by way of an example. Node A 520 has a routing region 540 of radius T and a flooding region 550 of radius 2T, both centered on node A. Another node B 530 is also considered. All nodes are considered for this example to be symmetrical, so that node B also has a routing region 560 of radius T and a flooding region of radius 2T (not shown), both centered on node B. Node A is within node B's routing region, and therefore it is desirable that node B receives network status updates from node A. In order facilitate node B receiving such network status updates, the flood region for node A is set to radius 2T. This allows node A to communicate network status updates to node B via paths such as path c, which lies partially outside of node A's routing region. Another possible path for network status updates, path a, which lies fully within the routing regions 540, 560 of both nodes A and B is possible, however the existence of such a path is not guaranteed due to link failures. Another possible path for network status updates, path b which lies fully within the routing region 540 of node A but partially outside the routing region 560 of node B is possible, however the existence of such a path is also not guaranteed due to link failures.

Figure 6:
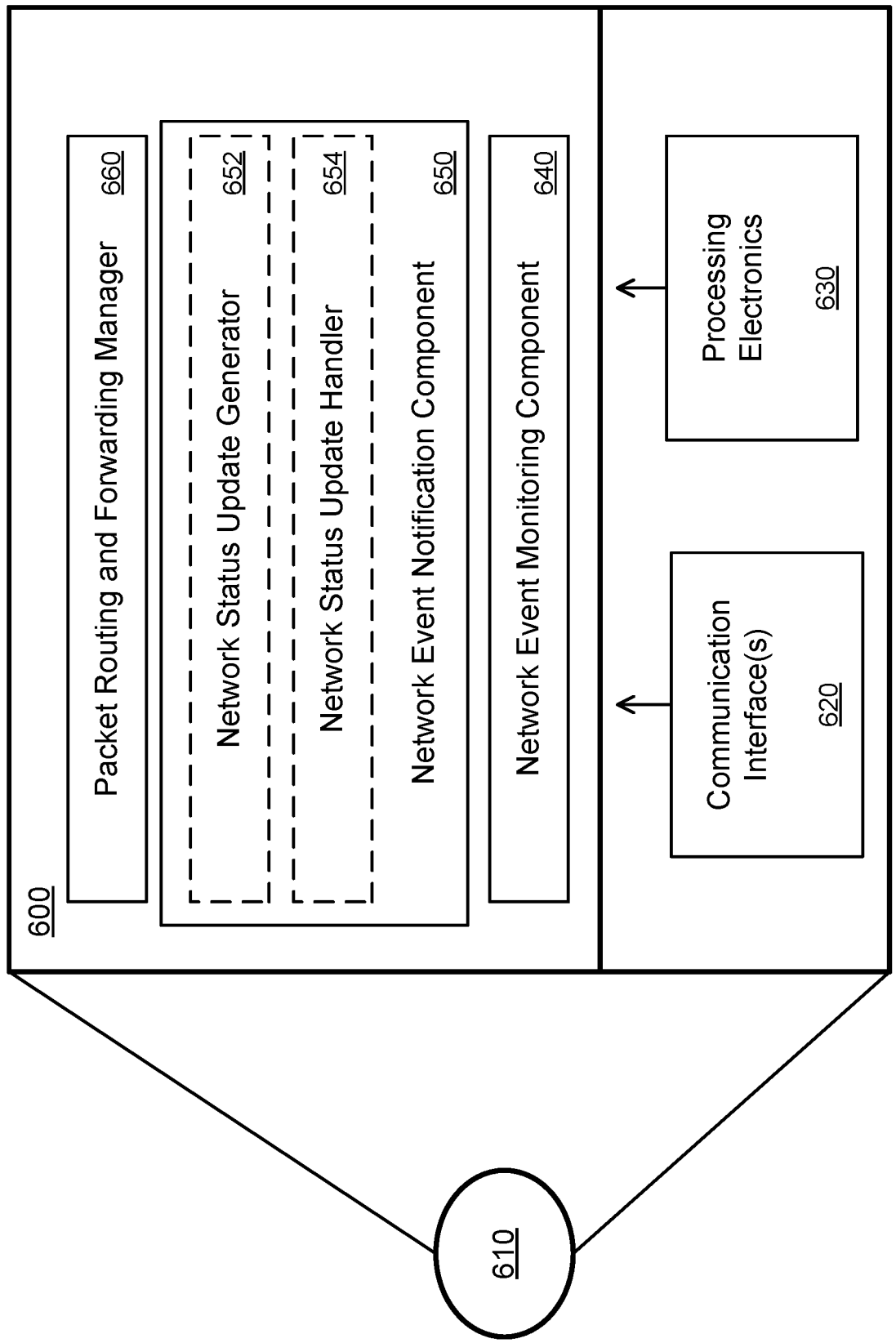
FIG. 6 illustrates an apparatus located in a network node, according to an embodiment of the present invention.

FIG. 6 illustrates an apparatus 600 located in a network node 610, according to an embodiment of the present invention. The apparatus 600 includes at least one communication interface 620 and processing electronics 630. The at least one communication interface 620 can include a combination of interfaces (e.g. including a satellite-to-satellite communication interface and a satellite-to-ground communication interface). The at least one communication interface can include multiple directional communication interfaces which are configured to communicate with different respective other network nodes, for example by orienting the different directional communication interfaces in different directions. The processing electronics can include components such as computer processors, memory, digital or analog circuits, or the like, or a combination thereof. The processing electronics 630 can be configured to provide the network event monitoring component 640, the network event notification component 650, and the packet routing and forwarding manager 660.

The network event monitoring component 640 is configured to monitor for network events, for example by monitoring for nearby link failures, nearby node failures, or messages received via the at least one communication interface 620 and indicative of network events such as node or link failures, node or link recoveries, or other events. The messages include network status updates received from neighbouring nodes and indicative of network events. Accordingly, the network event monitoring component is configured to receive network status updates indicative of changes in network conditions.

The network event notification component 650 is configured to generate messages indicative of network events, for transmission via the at least one communication interface, to other network nodes. The messages include network status updates transmitted to neighbouring nodes. In particular, the network event notification component can propagate received network status updates by transmitting these network status updates (after the counter fields are adjusted) toward other network nodes.

The network event notification component can include a network status update generator 652 and a network status update handler 654. The network status update generator 652 is configured, in response to a change in network conditions, to generate a network status update indicative of those changes. The generated network status update can include at least a first counter field and a second counter field. The first counter field is for use by subsequent nodes to track travel of the network status update in a first one or more directions, while the second counter field is for use by subsequent nodes to track travel of the network status update message in a second one or more directions.

The network status update handler 654 is configured, based on a direction corresponding to travel of a received network status update from another network node, to adjust content of at least one counter field included in the network status update. The network status update handler is further configured to cause the network node to either propagate or refrain from propagating the network status update to further nodes. The network status update handler can make a determination of whether or not to propagate the network status update based at least in part on content of the at least one counter field, either prior to or following adjustment thereof.

The packet routing and forwarding manager 660 is configured to manage packet routing and forwarding operations. For example, the packet routing and forwarding manager may maintain routing tables, routing trees, representations of network topologies, etc. The information maintained by the packet routing and forwarding manager may be based at least in part on notifications of network events (e.g. in the form of network status updates) received via the network event monitoring component 640. The packet routing and forwarding manager can maintain a network status database (such as a link state database), and adjust the network status database based on contents of network status updates. The packet routing and forwarding manager can adjust routing operations based on contents of network status updates.

The apparatus may further include a network tracking component (not shown) which is configured to track the location of the network node, the location of other network nodes, and related information regarding the network. This information can be used for routing purposes. The network tracking component can provide information to the packet routing and forwarding manager 660 for use in routing and forwarding packets.

Figure 7:
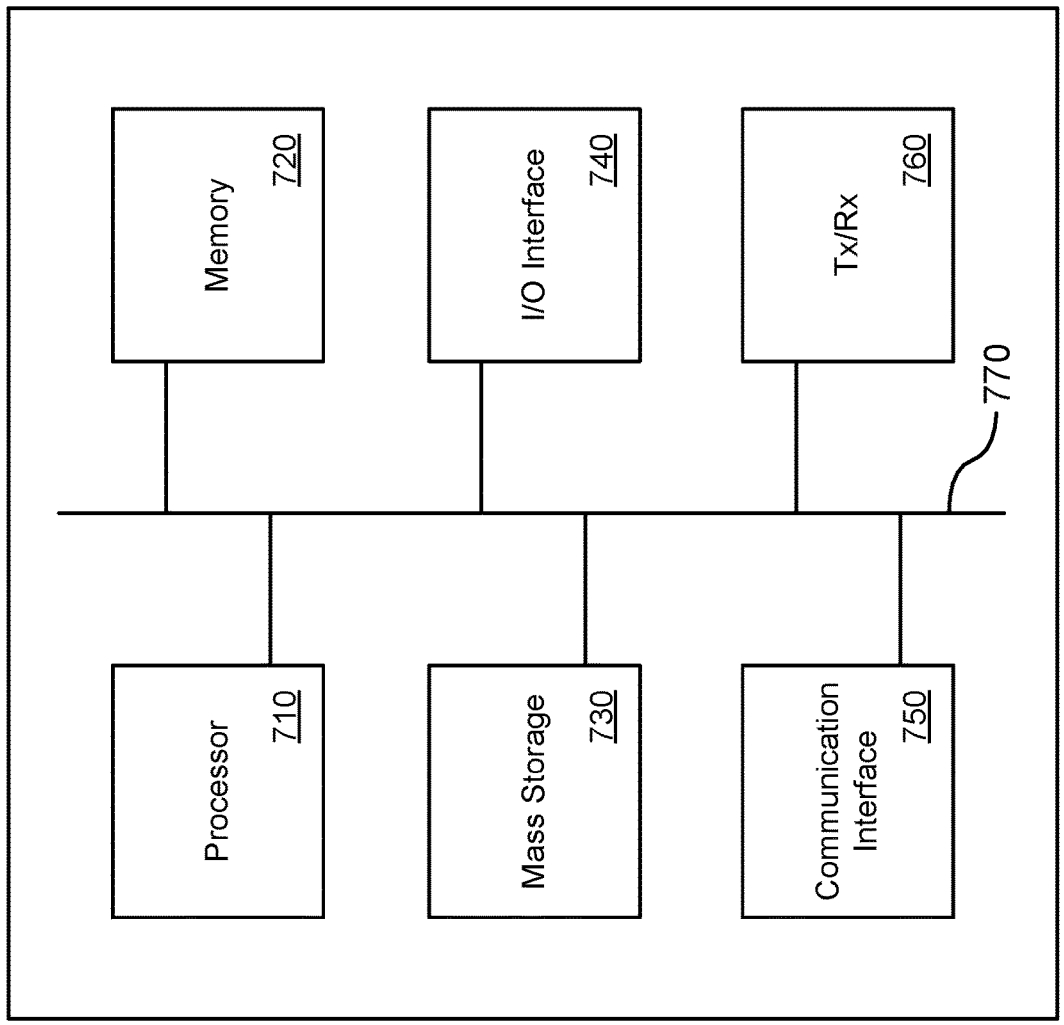
FIG. 7 is a schematic diagram of an electronic device that may perform any or all of operations of the above methods and features explicitly or implicitly described herein, according to different embodiments of the present invention.

FIG. 7 is a schematic diagram of an electronic device 700 that may perform any or all of operations of the above methods and features explicitly or implicitly described herein, according to different embodiments of the present invention. For example, a computer equipped with network function may be configured as electronic device 700.

As shown, the device includes a processor 710, such as a Central Processing Unit (CPU) or specialized processors such as a Graphics Processing Unit (GPU) or other such processor unit, memory 720, non-transitory mass storage 730, I/O interface 740, communication interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for managing network status information in a network, the method comprising, at a network node:

receiving a network status update from an other network node in the network, the network status update indicative of a change in network conditions;

adjusting, based on a direction corresponding to travel of the network status update from the other network node to the network node, content of at least one counter field included in the network status update, wherein the at least one counter field tracks aspects of a net travel by the network status update from an origin thereof; and propagating or refraining from propagating the network status update to one or more further network nodes based at least in part on said content of the at least one counter field either prior to or following said adjusting; wherein the direction is one of two opposing directions in a coordinate system such that travel in one of the two opposing directions cancels out travel in the other of the two opposing directions; and wherein net travel is determined by subtraction of travel in one of the opposing directions from travel in the other of the opposing directions.

2. The method of claim 1, wherein adjusting content of said at least one counter field comprises increasing a value held in a corresponding one of the counter fields when the direction is a first direction, and decreasing the value held in said corresponding one of the counter fields when the direction is a second direction.

3. The method of claim 2, wherein the second direction is opposite the first direction.

4. The method of claim 1, wherein adjusting content of the at least one counter field comprises incrementing or decrementing a corresponding one of the counter fields by one unit to track the net travel as a net number of hops traversed by the network status update.

5. The method of claim 1, wherein adjusting content of the at least one counter field comprises increasing or decreasing one or more of the counter fields by one or more amounts representing the net travel as a net physical distance or network distance traversed by the network status update from said other node.

6. The method of claim 1, wherein the at least one counter field comprises a first counter field and a second counter field, and wherein adjusting content of said at least one counter field comprises adjusting a value held in the first counter field when the direction is a first direction, and adjusting a value held in the second counter field when the direction is another direction which is different from the first direction.

7. The method of claim 6, wherein said other direction is orthogonal to the first direction.

8. The method of claim 1, wherein propagating or refraining from propagating is based on a computation of said net travel based on said content of the at least one counter field.

9. The method of claim 8, wherein said computation of said net travel comprises comparing the net distance to a maximum allowable net travel, and wherein said propagating or refraining from propagating the network status update to one or more further network nodes comprises transmitting the network status update to said one or more further network nodes when the net travel is less than or equal to the maximum allowable net distance, and refraining from transmitting the network status update to said one or more further network nodes when the net travel is greater than the maximum allowable net travel.

10. The method of claim 8, wherein at least one of the counter fields is initialized to a maximum value and decremented due to travel of the network status update in a corresponding direction, the computation of net travel comprises determining if the at least one of the counter fields has reached a zero value, and said propagating or refraining from propagating the network status update to one or more further network nodes comprises transmitting the network status update to said one or more further network nodes when the at least one of the counter fields is above the zero value, and refraining from transmitting the network status update to said one or more further network nodes when the at least one of the counter fields is at the zero value.

11. The method of claim 1, wherein the at least one counter field comprises a plurality of counter fields corresponding to different directions, the plurality of counter fields collectively tracking aspects of a net distance travelled by the network status update from an origin thereof, and wherein propagating or refraining from propagating is based on a computation of said net distance based on content of the plurality of counter fields.

12. The method of claim 1, further comprising determining the direction corresponding to travel of the network status update based on which one of a plurality of directional communication interfaces of the network node receives the network status update, each of said plurality of directional communication interfaces being oriented in a different direction.

13. The method of claim 1, wherein the at least one counter fields comprises a first counter field tracking distance travelled by the network status update in a first direction and a second counter field tracking distance travelled by the network status update in a second direction opposite the first direction.

14. A method for managing network status information in a network, the method comprising, at a network node:

in response to a change in network conditions, generating a network status update indicative of said change in network conditions, wherein the network status update comprises at least a first counter field and a second counter field, the first counter field for use by subsequent nodes to track travel of the network status update in a first one or more directions, the second counter field for use by subsequent nodes to track travel of the network status update message in a second one or more directions; and transmitting the network status update toward one or more other neighbouring network nodes.

15. The method of claim 14, wherein at least one of the second one or more directions is orthogonal to at least one of the first one or more directions.

16. The method of claim 14, wherein the first one or more directions comprise a pair of opposite directions, content of the first counter field being incremented by said subsequent nodes in response to travel of the network status update in one of the pair of opposite directions and content of the first counter field being decremented by said subsequent nodes in response to travel of the network status update in the other of the pair of opposite directions.

17. The method of claim 14, wherein the first counter field and the second counter field are initialized to zero, the network status update further comprises at least one field representing a maximum allowable net distance of travel for the network status update, and wherein subsequent nodes compare distance, as tracked by at least the first counter field and the second counter field, to the maximum allowable net distance of travel, and refrain from propagating the network status update when the maximum allowable net distance of travel is reached or exceeded.

18. The method of claim 14, wherein the first counter field and the second counter field are initialized to respective maximum values, and wherein subsequent nodes propagate the network status update when one or both of the first counter field and the second counter field are greater than zero and refrain from propagating the network status update when one or both of the first counter field and the second counter field reach zero.

19. An apparatus for supporting packet routing by a node in a network, the apparatus located at a node of the network, the apparatus comprising at least one communication interface and processing electronics and configured to:
- receive, by one of the at least one communication interfaces, a network status update from an other network node in the network, the network status update indicative of a change in network conditions;
- adjust, based on a direction corresponding to travel of the network status update from the other network node to the network node, content of at least one counter field included in the network status update, wherein the at least one counter field tracks aspects of a net travel by the network status update from an origin thereof; and
- propagate or refrain from propagating, using one or more of the at least one communication interfaces, the network status update to one or more further network nodes based at least in part on said content of the at least one counter field either prior to or following said adjusting;
- wherein the direction is one of two opposing directions in a coordinate system such that travel in one of the two opposing directions cancels out travel in the other of the two opposing directions; and
- wherein the net travel is determined by subtraction of travel in one of the opposing directions from travel in the other of the opposing directions.

20. The apparatus of claim 19, wherein the at least one communication interface includes a plurality of directional communication interfaces oriented in different directions, the apparatus further configured to determine the direction corresponding to travel of the network status update based on which one of a plurality of directional communication interfaces of the network node receives the network status update.

21. The apparatus of claim 19, wherein adjusting content of said at least one counter field comprises increasing a value held in a corresponding one of the counter fields when the direction is a first direction, and decreasing the value held in said corresponding one of the counter fields when the direction is a second direction.

22. The apparatus of claim 19, wherein the at least one counter field comprises a first counter field and a second counter field, and wherein adjusting content of said at least one counter field comprises adjusting a value held in the first counter field when the direction is a first direction, and adjusting a value held in the second counter field when the direction is another direction which is different from the first direction.

23. The apparatus of claim 19, wherein propagating or refraining from propagating is based on a computation of said net travel based on said content of the at least one counter field.

24. The apparatus of claim 19, wherein the at least one counter field comprises a plurality of counter fields corresponding to different directions, the plurality of counter fields collectively tracking aspects of a net distance travelled by the network status update from an origin thereof, and wherein propagating or refraining from propagating is based on a computation of said net distance based on content of the plurality of counter fields.

* * * * *